US009063836B2

(12) United States Patent
Swanson et al.

(10) Patent No.: US 9,063,836 B2
(45) Date of Patent: Jun. 23, 2015

(54) METHODS AND APPARATUS TO PROTECT SEGMENTS OF MEMORY

(75) Inventors: Robert C. Swanson, Olympia, WA (US); Eric R. Wehage, Tenino, WA (US); Vincent J. Zimmer, Federal Way, WA (US); Mallik Bulusu, Olympia, WA (US)

(73) Assignee: INTEL CORPORATION, Santa Clara, CA (US)

( * ) Notice: Subject to any disclaimer, the term of this patent is extended or adjusted under 35 U.S.C. 154(b) by 891 days.

(21) Appl. No.: 12/843,617

(22) Filed: Jul. 26, 2010

(65) Prior Publication Data

US 2012/0023364 A1  Jan. 26, 2012

(51) Int. Cl.
*G06F 11/00* (2006.01)
*G06F 11/10* (2006.01)

(52) U.S. Cl.
CPC .......... *G06F 11/004* (2013.01); *G06F 11/1008* (2013.01)

(58) Field of Classification Search
CPC ............. G06F 11/106; G06F 11/0721; G06F 11/0793; G06F 11/542
USPC ................. 714/6.13, 42, 38.13, 763; 712/216
See application file for complete search history.

(56) References Cited

U.S. PATENT DOCUMENTS

| | | | | |
|---|---|---|---|---|
| 5,345,583 | A * | 9/1994 | Davis | 714/23 |
| 6,240,531 | B1 * | 5/2001 | Spilo et al. | 714/38.13 |
| 6,311,255 | B1 * | 10/2001 | Sadana | 711/152 |
| 6,453,429 | B1 * | 9/2002 | Sadana | 714/43 |
| 6,745,296 | B2 | 6/2004 | Chong | |
| 7,165,135 | B1 * | 1/2007 | Christie et al. | 710/269 |
| 7,318,171 | B2 | 1/2008 | Rothman et al. | |
| 7,321,990 | B2 | 1/2008 | Zimmer et al. | |
| 7,904,791 | B2 | 3/2011 | Hwang et al. | |
| 2002/0169951 | A1 * | 11/2002 | Zimmer | 713/100 |
| 2003/0140271 | A1 * | 7/2003 | Wynn et al. | 714/8 |
| 2004/0034816 | A1 | 2/2004 | Richard | |
| 2005/0185476 | A1 * | 8/2005 | Tachikawa | 365/189.05 |

(Continued)

FOREIGN PATENT DOCUMENTS

| | | |
|---|---|---|
| JP | 2000132462 | 5/2000 |
| JP | 2006250936 | 9/2006 |
| KR | 20080014300 | 2/2008 |

OTHER PUBLICATIONS

International Search Report and Written Opinion issued in connection with International Application No. PCT/US2011/044744 on Apr. 6, 2012 (8 pages).

(Continued)

*Primary Examiner* — Bryce Bonzo
*Assistant Examiner* — Jeison C Arcos
(74) *Attorney, Agent, or Firm* — Hanley, Flight & Zimmerman, LLC

(57) ABSTRACT

Methods and apparatus to protect segments of memory are disclosed herein. An example method includes intercepting an interrupt request indicating an error; determining whether a first segment of memory is corrupt, the first segment of memory being designated as a protected region of memory; when the protected region of memory is corrupt, repairing the corrupted region of memory using a parity block of code; and in response to validating the protected region of memory, generating an interrupt enabling a utilization of code stored in the protected region of memory to handle the error associated with the interrupt request.

20 Claims, 8 Drawing Sheets

(56) References Cited

U.S. PATENT DOCUMENTS

| | | | |
|---|---|---|---|
| 2005/0188278 A1* | 8/2005 | Zimmer et al. | 714/42 |
| 2006/0203883 A1 | 9/2006 | Griffin | |
| 2006/0294432 A1* | 12/2006 | Thelen | 714/38 |
| 2008/0126650 A1* | 5/2008 | Swanson et al. | 710/267 |
| 2008/0155153 A1* | 6/2008 | Yoshii et al. | 710/262 |
| 2009/0144600 A1* | 6/2009 | Perlmutter et al. | 714/763 |
| 2009/0265598 A1* | 10/2009 | Lasser | 714/746 |
| 2010/0017581 A1* | 1/2010 | Clift et al. | 712/216 |
| 2010/0165689 A1* | 7/2010 | Rotbard et al. | 365/45 |
| 2011/0087920 A1* | 4/2011 | Hendricks et al. | 714/21 |

OTHER PUBLICATIONS

European Patent Office, "Communication pursuant to Rules 161(2) and 162 EPC," issued in connection with Application No. 11815003.6, Mar. 26, 2013, 2 pages.

International Bureau, "International Report on Patentability," issued in connection with Application No. PCT/US2011/044744, mailed on Feb. 7, 2013 5 pages.

Japan Patent Office, "Decision to Grant," issued in connection with Application No. 2013-521829, Feb. 25, 2014, 4 pages.

Korean Intellectual Property Office, "Notice of Preliminary Rejection," issued in connection with Application No. 10-2013-7002135, Mar. 18, 2014, 9 pages.

Korean Intellectual Property Office, "Letters Patent," issued in connection with Application No. 10-2013-7002135, Dec. 9, 2014, 3 pages.

IP Australia, "Certificate of Grant," issued in connection with Application No. 2011286271 on Nov. 20, 2014, 1 page.

IP Australia, "Patent Examination Report No. 1," issued in connection with Application No. 2011286271 on Nov. 13, 2013, 2 pages.

IP Australia, "Notice of Acceptance," issued in connection with Application No. 2011286271 on Jul. 25, 2014, 2 page.

* cited by examiner

|    | C1 | C2 | C3 | C4 |           |
|----|----|----|----|----|-----------|
|    | x  |    |    |    | CODE blk0 |
|    |    | x  |    |    | CODE blk1 |
|    |    |    |    |    | CODE blk2 |
|    |    |    |    | x  | CODE blk3 |
|    |    |    |    |    | CODE blk4 |
|    |    |    | x  |    | CODE blk5 |
|    |    |    |    |    | CODE blk6 |
|    |    |    |    |    | PARITY blk |

XOR

FIG. 7

|    | C1 | C2 | C3 | C4 |            |
|----|----|----|----|----|------------|
|    | x  |    |    |    | CODE blk0  |
|    |    | x  |    | x  | CODE blk1  |
|    |    |    |    |    | CODE blk2  |
|    | x  |    |    | x  | CODE blk3  |
|    |    |    | x  |    | CODE blk4  |
|    |    | x  | x  |    | CODE blk5  |
|    |    |    |    |    | QUOTIENT   |
|    |    |    |    |    | PARITY blk |

FIG. 8

METHODS AND APPARATUS TO PROTECT SEGMENTS OF MEMORY

FIELD OF THE DISCLOSURE

The present disclosure relates generally to computer system platforms and, more particularly, to methods and apparatus to protect segments of memory.

BACKGROUND

Computing platforms typically include a plurality of memory segments that may vary in type, size, purpose, etc. A first component (e.g., a user application or program) stored in association with a first memory may rely on a second component (e.g., an operating system) stored in association with a second memory to operate properly and/or to operate at all (e.g., when the first component cannot be initialized when the second component is inoperative). Therefore, despite the additional necessary resources, certain types or segments of memory warrant one or more protection mechanisms, programs, routines, or devices that ensure the proper operation of one or more components stored therein.

BRIEF DESCRIPTION OF THE DRAWINGS

FIG. 7 is a diagram of the code blocks of FIG. 1 as protected by a first algorithm of the example protection mechanism of FIG. 1.

FIG. 8 is a diagram of the code blocks of FIG. 1 as protected by a second algorithm of the example protection mechanism of FIG. 1.

DETAILED DESCRIPTION

Figure 1:
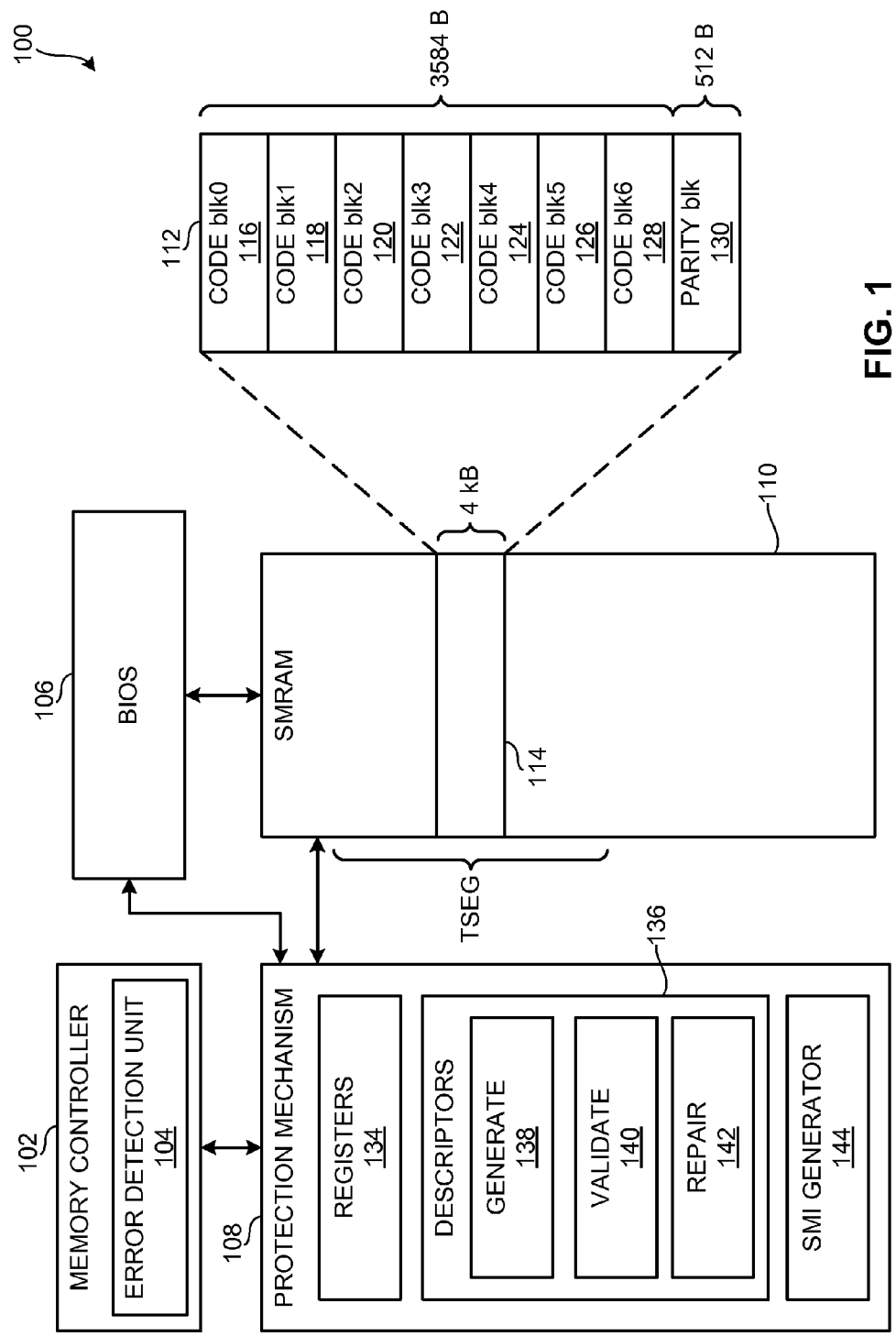
FIG. 1 is a block diagram illustrating example components of an example computing platform including an example protection mechanism.

Although the following discloses example methods, apparatus, systems, and/or articles of manufacture including, among other components, firmware and/or software executed on hardware, it should be noted that such methods, apparatus, systems, and/or articles of manufacture are merely illustrative and should not be considered as limiting. For example, it is contemplated that any or all of the firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

The example methods, apparatus, systems, and/or articles of manufacture described herein provide protection for a segment of memory and code and/or data stored therein. For purposes of illustration and not limitation, these example methods, apparatus, systems, and/or articles of manufacture are described herein in connection with host dynamic random access memory (DRAM). In particular, the examples described herein involve protection of an error handling system stored in host DRAM. However, the examples described herein can be implemented in association with different types of system(s), mechanism(s), program(s), device(s), etc. stored in host DRAM. For example, in addition to or instead of the protection provided to the error handling system described herein, the example methods, apparatus, systems, and/or articles of manufacture described herein may be implemented in connection with an executable related to graphics UMA (Unified Memory Architecture) stored in host DRAM, an executable related to a power management unit (PMU) (e.g., 8051 code on MIDs) stored in host DRAM, and/or any other component, unit, mechanism, program, etc. stored in host DRAM. Moreover, the memory protection provided by the example methods, apparatus, systems, and/or articles of manufacture described herein can be implemented in association with additional or alternative types or segments of memory other than host DRAM.

Conventional computing platforms include error correction code (ECC) and memory protection units to respond to undesirable, unexpected, and/or unacceptable events or conditions associated with, for example, operation of a processor or memory. In x86 platforms, for example, the basic input output system (BIOS) uses a System Management Mode (SMM), which can be invoked through a System Management Interrupt (SMI). Components associated with an SMM are typically stored in a section of host DRAM sometimes referred to as the System Management Random Access Memory (SMRAM). For example, SMRAM typically includes an SMM handler having code configured to correct one or more types of errors in a computing platform.

Certain errors have the potential to affect or corrupt segments of the DRAM and, in turn, the SMM handler and/or other components associated with the BIOS SMM. The BIOS executing in SMM in such situations (e.g., when an error has occurred in the SMM handler) may lead to a corruption of the processor that results in a complete shutdown. Thus, in prior systems, memory protection units typically implemented additional error handlers to manage such errors. For example, some memory protection units utilize an error handler based in the Baseboard Management Controller (BMC) for errors that can corrupt the SMRAM, thereby dedicating additional resources to error handling.

Generally, the example methods, apparatus, systems, and/or articles of manufacture described herein protect a processor from an ECC error occurring in, for example, an SMM region of the SMRAM. That is, the examples described herein enable the BIOS to execute an interrupt routine using SMM components (e.g., the SMM handler) in response to an ECC error even when the ECC error or another previous error(s) has affected code related to the SMM. To enable such correction of an error, the examples described herein configure a protected address space in the SMRAM to store the SMM handler. Furthermore, the examples described herein provide a hardware-based protection mechanism to intercept a signal that would trigger the BIOS to execute in SMM mode. Before allowing the BIOS to execute in SMM, the hardware-based protection mechanism attempts to validate the contents of the secured address space as error-free. In response to determining that an error may have affected the SMM handler, the hardware-based protection mechanism regenerates or repairs one or more pieces of affected code in the secured address space, such as within a protected address space of SMRAM. After ensuring an error free SMM space, the example protection mechanism, which is described in greater detail below, allows the BIOS to execute the SMM handler to correct the initial error.

Among other benefits and advantages provided by the examples described herein, this protection, validation, and/or correction of such scenarios (e.g., ECC errors affecting SMM components) eliminates, or at least reduces, the need for computing platforms to "double invest" in error handling via a BIOS and additional error handlers (e.g., a BMC-based error handler). Moreover, the examples described herein provide a recovery mechanism for certain types of errors that were previously considered uncorrectable using SMM components. Additional benefits and advantages provided by the examples described herein will be readily apparent in light of the detailed description herein.

FIG. 1 is a block diagram illustrating an example computing platform 100 capable of protecting segments of memory in accordance with the example methods, apparatus, systems, and/or articles of manufacture described herein. The platform 100 may be any type of computing platform such as, for example, a personal computer, a workstation, a server, a PDA, a kiosk, a smartphone, etc.

The example computing platform 100 of FIG. 1 includes a memory controller 102 having an error detection unit 104 capable of detecting one or more errors occurring in the computing platform 100 in any suitable manner. For example, the error detection unit 104 may be implemented by an IIO (integrated input/output system) of a processor (e.g., the example processor 912 described below in connection with FIG. 9). In response to detecting an error, the example error detection unit 104 generates a request for an SMI. The SMI request may include information regarding a location of the error, such as an address in memory in which the error was detected. Moreover, the example error detection unit 104 and/or another component(s) of the memory controller 102 may mark the memory address in which the error occurred with a poison indicator.

In previous systems, the SMI request would likely lead to an immediate generation of an SMI and, in turn, execution of an SMM interrupt routine by, for example, a BIOS 106. However, in the illustrated example, the SMI request generated by the memory controller 102 is intercepted by a hardware-based protection mechanism 108 configured in accordance with the example methods, apparatus, systems, and/or articles of manufacture described herein. To receive the SMI request, the example protection mechanism 108 includes a communication interface (not shown) configured to receive such signals from the memory controller 102. In the illustrated example, the protection mechanism 108 is implemented by a direct memory access Crystal Beach (CB) Direct Memory Access (DMA) engine, but is not limited thereto. The protection mechanism 108 may be implemented in additional or alternative components of the example computing platform 100 and/or by different types of engines or devices.

As described above, the BIOS 106 attempting to handle an ECC error that has affected certain portions of the SMRAM is hazardous as the SMM interrupt routine to be executed by the BIOS 106 may itself be corrupted. Therefore, in the illustrated example, the interception of the SMI request (e.g., as generated by the memory controller 102) by the DMA engine 108 suspends the BIOS 106 from handling the corresponding ECC error until the integrity of the SMM components (e.g., an SMM handler) can be verified. As described in greater detail below, the DMA engine 108 validates and, in the case of one or more SMM corruptions, regenerates or repairs SMM code to be utilized in recovering from the error. When the memory segments (e.g., cache lines) associated with the SMM are each validated and/or corrected, the DMA engine 108 generates an SMI corresponding to the SMI request received by the DMA engine 108 that can then be handled by the BIOS 106. Due to the DMA engine 108 ensuring an error-free SMM code, the BIOS 106 can utilize the SMM code without negative consequences (e.g., without causing a full shutdown).

To enable such protection, the computing platform 100 undergoes a plurality of initializations related to the DMA engine 108 and SMRAM 110. That is, initial configurations of certain hardware mechanisms and software elements enable the example computing platform 100 to protect segments of memory as described herein. For example, an SMM handler 112 is placed in a protected page 114 of the SMRAM 110 within a Top of Segment (TSEG) region thereof. In the illustrated example, the protected page 114 is four kilobytes (4 kB) in size and includes seven (7) code blocks 116-128. The contents of the code blocks 116-128 are executable code that is used to correct errors in memory. The contents of the code blocks 116-128 are constant and include only code blocks (i.e., no data blocks). The last five hundred twelve bytes (512 B) of the SMM handler 112 are reserved for a parity block 130. The BIOS 106 causes the DMA engine 108 to generate the parity block 130 during an initialization process (e.g., a power-on self test (POST)). Additionally, the BIOS 106 programs registers 134 of the DMA engine 108 with the location of the protected region 114 and locks the registers 134 with the location of the protected region 114 programmed therein.

In the illustrated example, the code blocks 116-128 are configured (e.g., by the BIOS 106) to disallow data field alterations. As a result, the DMA engine 108 generates the parity block 130 once during an initialization process (e.g., during POST boot). However, in some examples, the code blocks 116-128 may be configured (e.g., by the BIOS 106) to include alterable data fields. In such instances, the DMA engine 108 generates the parity block 130 after each alteration of one or more of the code blocks 116-128

In some examples, the error detection unit 104 (e.g., an integrated input/output (IIO) system) of the memory controller 102 is initialized to route ECC error signals to the DMA engine 108. While the DMA engine 108 is described above as intercepting an ECC error signal (e.g., an SMI request), the example computing platform 100 may be configured to automatically route such signals through the DMA engine 108.

The DMA engine 108 is also configured to include a channel (e.g., a hidden channel) that executes either a generate opcode (e.g., to generate the parity block 130), a validate opcode (e.g., to check the integrity of a cache line in the protected region 114), or a repair opcode (e.g., to repair a cache line in the protected region 114) that is sent to the protected region 114. In the illustrated example, the channel is limited to accessing the protected region 114 with the TSEG memory of SMRAM 110. Moreover, the channel is the only channel that can access the protected region 114 in the example computing platform 100. The BIOS 106 verifies this access configuration (e.g., the channel of the DMA engine 108 being the only channel with access to the protected region 114 and the protected region 114 being entirely within TSEG) before enabling operation of the DMA engine 108. Further, the channel bypasses a Virtualization Technology for Directed I/O (VT-d) engine, if present, to prevent translation and/or a security violation.

Figure 2:
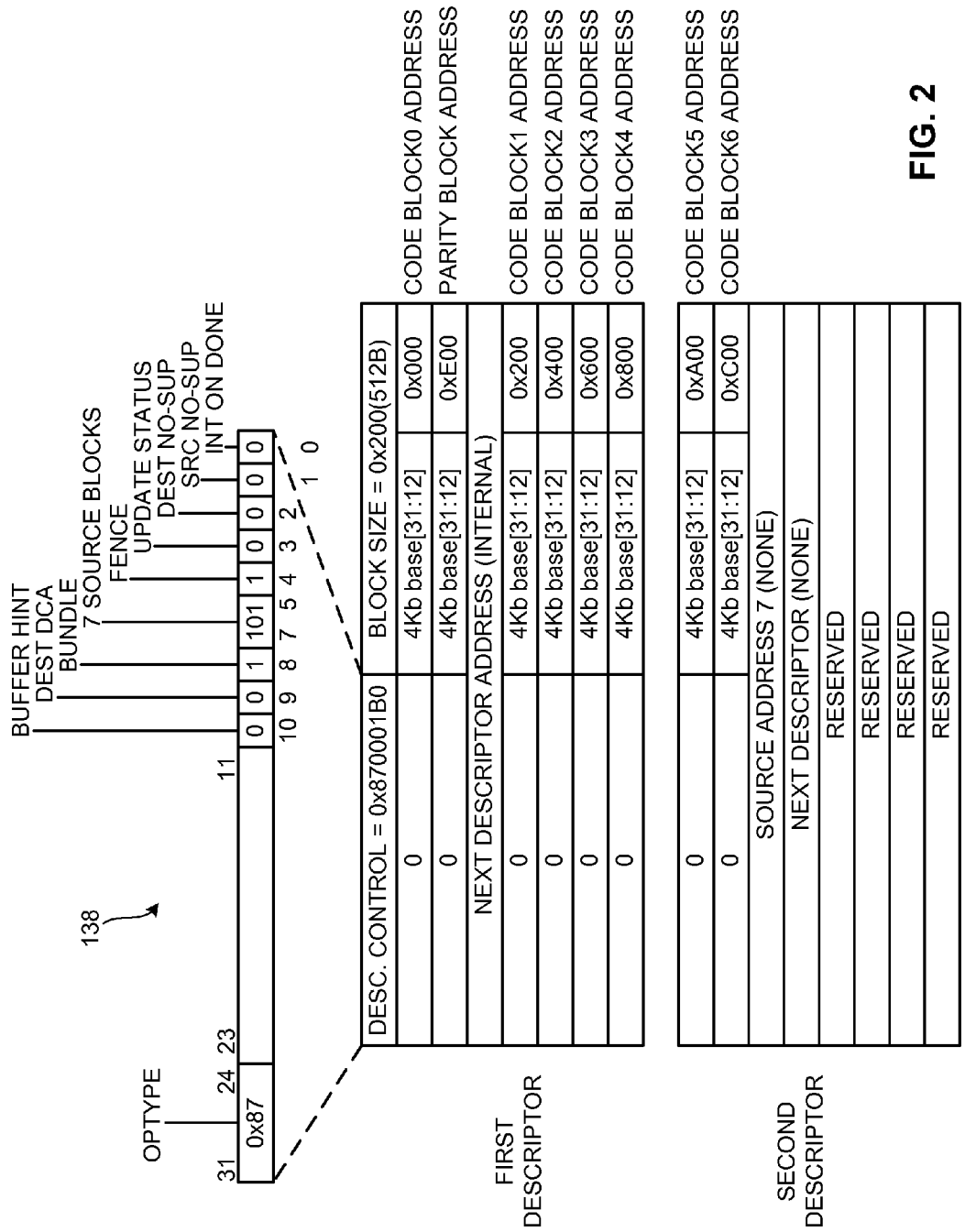
FIG. 2 is an example implementation of the generate descriptor of FIG. 1.

In the illustrated example, the generate, validate, and repair operations described above are implemented by a plurality of descriptors 136. The example plurality of descriptors 136 includes a generate descriptor 138 to generate the parity block 130 of the protected region 114. In the illustrated example, the generate descriptor 138 causes generation of the parity block 130 according to the following equation of the contents of the code blocks 116-128 that have been loaded: parity_blk=Code_blk0 XOR Code_blk1 XOR Code_blk2 XOR Code_blk3 XOR Code_blk4 XOR Code_blk5 XOR Code_blk6. An example implementation of the generate descriptor 138 is illustrated in FIG. 2. The example generate descriptor 138 is configured in accordance with a RAID-5 algorithm utilizing parity generation. The 4 kB base is programmable. As shown in FIG. 2, the opcode for the generate descriptor 138 is 0x87.

Figure 3:
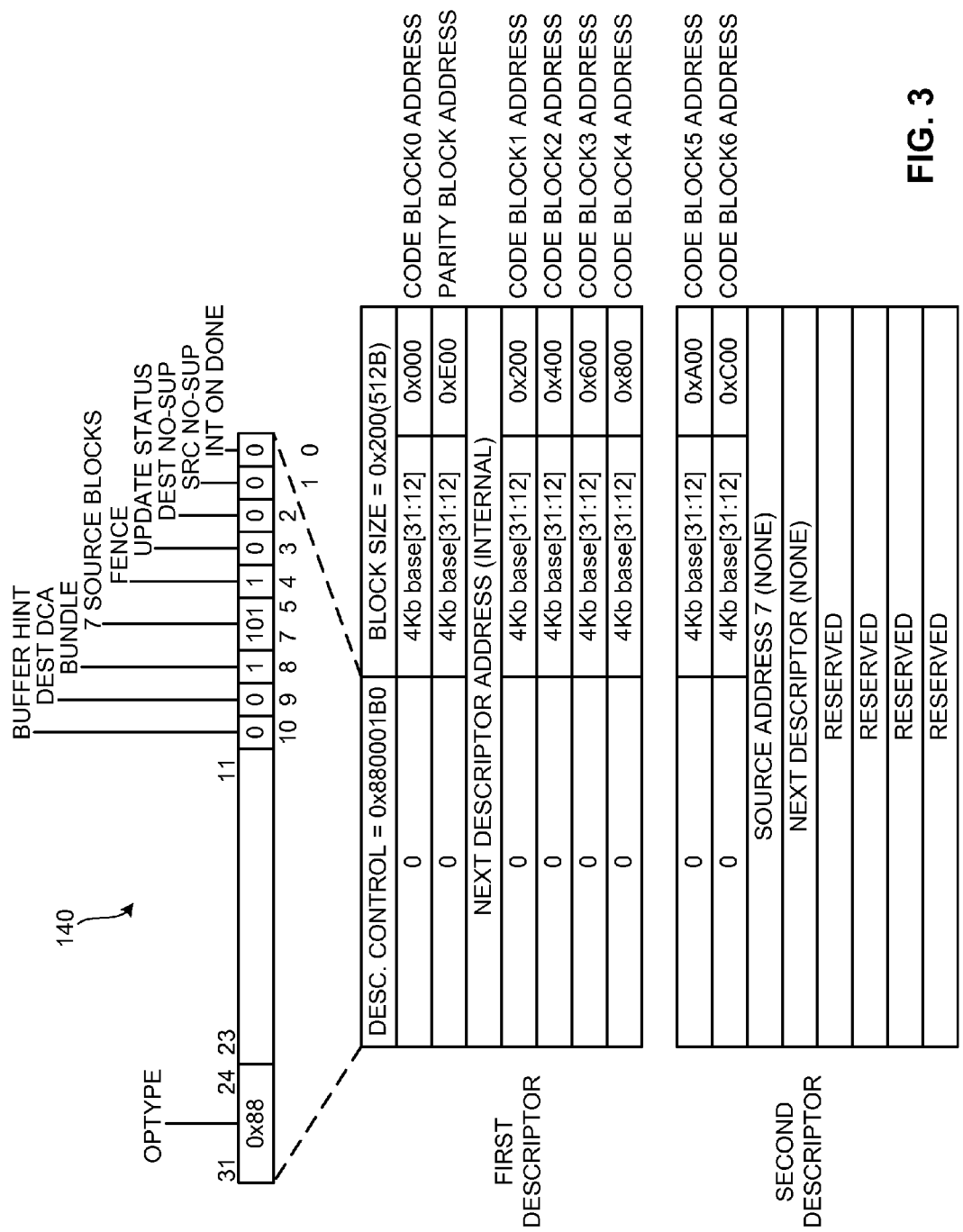
FIG. 3 is an example implementation of the validate descriptor of FIG. 1.

Referring back to FIG. 1, the example plurality of descriptors 136 also includes a validate descriptor 140 to validate the contents of the code blocks 116-128. The example validate descriptor 140 checks cache lines of the SMM handler 112 (i.e., the code blocks 116-128) to determine whether any of the cache lines is marked with a poison indicator. The error detection unit 104 or the memory controller 102 marks cache lines including a detected error with a poison indicator. The presence of such an indicator causes the validate descriptor 140 to determine that a corresponding cache line includes an error. An example implementation of the validate descriptor 140 is illustrated in FIG. 3. The example validate descriptor 140 is similar to the example generate descriptor 138 described above. However, the opcode for the validate descriptor 140 is 0x88. During execution of the validate descriptor 140, if any block is found to have an error as indicated by a poison bit being set on an 'uncorrectable ECC error,' the failing source address is captured for the given cache line and the DMA engine 108 is halted.

Figure 4:
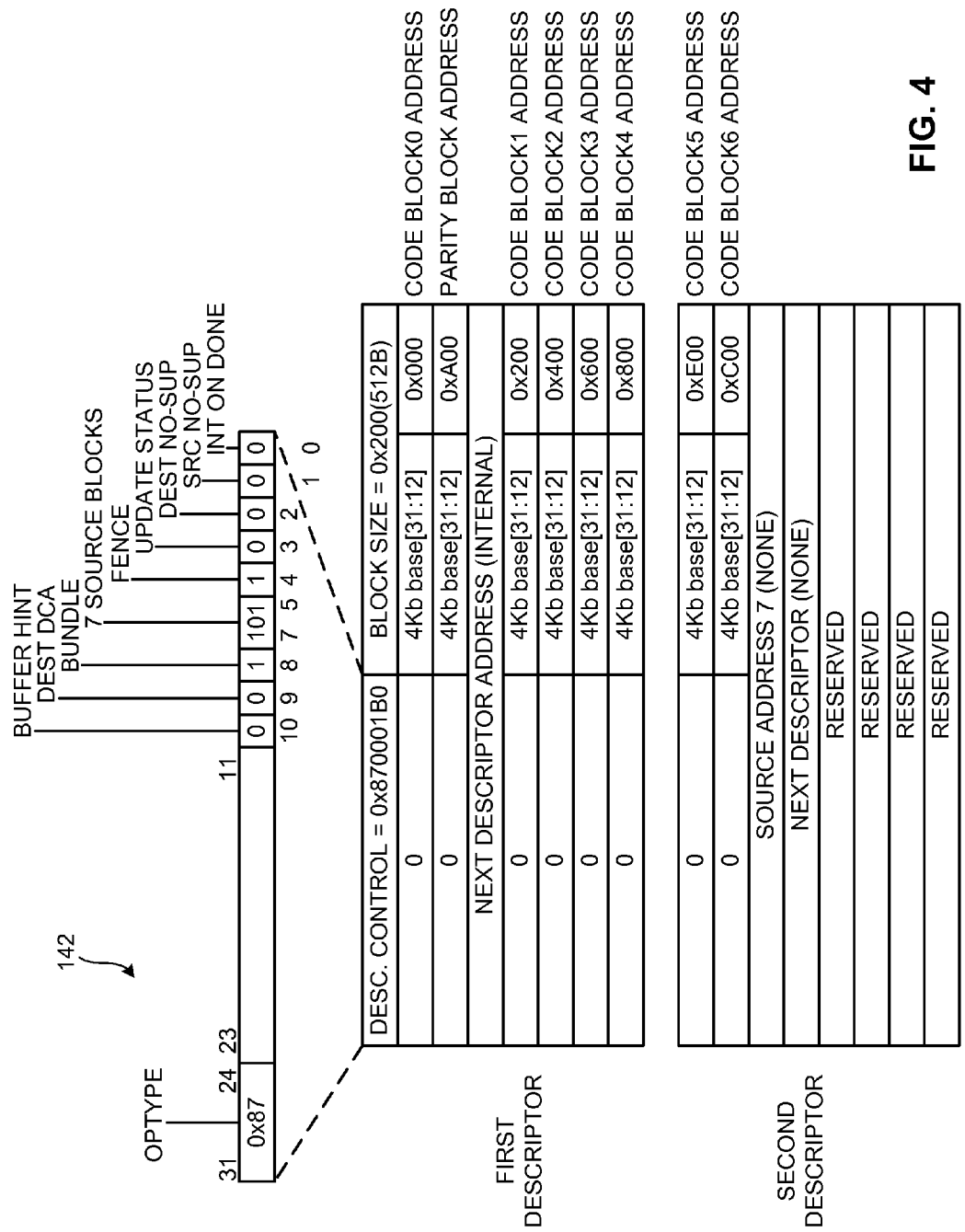
FIG. 4 is an example implementation of the repair descriptor of FIG. 1.

The example plurality of descriptors 136 also includes a repair descriptor 142 to repair the contents of the SMM handler 112 in the event that one or more of the code blocks 116-128 include an error (e.g., as determined by the validation attempts described above). An example implementation of the repair descriptor 142 is illustrated in FIG. 4. In the illustrated example, only the failing cache line is repaired. The example repair descriptor 142 of FIG. 4 is similar to the generate descriptor 138. However, the operable length is changed to one cache line (64 kB). Additionally, in the repair descriptor 142, the failing source address detected in the validation described above (only bits [11:8] are needed) is used as the parity block address, while the parity block address is used to replace the address of the failing source block. For example, as shown by a comparison of the code block addresses in FIG. 2 with the code block addresses in FIG. 4, when the error occurred in code block 5, the parity block address of the repair descriptor 142 is replaced by the code block 5 address (i.e., 0xA00) and the code block 5 address is replaced by the parity block address (0xE00).

Referring back to FIG. 1, the example DMA engine 108 of FIG. 1 also includes an SMI generator 144. As the example DMA engine 108 is configured to receive error indications (e.g., SMI requests) from the error detection unit 104, the example SMI generator 144 of the DMA engine 108 is capable of generating SMIs corresponding to the SMI requests received by the DMA engine 108. The example SMI generator 144 generates and conveys SMIs to the BIOS 106 in response to the DMA engine 108 verifying and/or establishing the integrity of the SMM handler 112. The BIOS 106 can then utilize the SMM handler 112 without the risk of the SMM handler 112 including an error.

While an example manner of implementing the computing platform 100 of FIG. 1 has been illustrated in FIG. 1, one or more of the elements, processes and/or devices illustrated in FIG. 1 may be combined, divided, re-arranged, omitted, eliminated and/or implemented in any other way. Further, the example protection mechanism 108, the example registers 134, the example generate descriptor 138, the example validate descriptor 140, the example repair descriptor 142, the example SMI generator 144, the example SMM handler 112, the example protected region 114, and/or, more generally, the example computing platform 100 of FIG. 1 may be implemented by hardware, software, firmware and/or any combination of hardware, software and/or firmware. Thus, for example, any of the example protection mechanism 108, the example registers 134, the example generate descriptor 138, the example validate descriptor 140, the example repair descriptor 142, the example SMI generator 144, the example SMM handler 112, the example protected region 114, and/or, more generally, the example computing platform 100 of FIG. 1 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example protection mechanism 108, the example registers 134, the example generate descriptor 138, the example validate descriptor 140, the example repair descriptor 142, the example SMI generator 144, the example SMM handler 112, the example protected region 114, and/or, more generally, the example computing platform 100 of FIG. 1 are hereby expressly defined to include a tangible medium such as a memory, DVD, CD, etc. storing the software and/or firmware. Further still, the example protection mechanism 108, the example registers 134, the example generate descriptor 138, the example validate descriptor 140, the example repair descriptor 142, the example SMI generator 144, the example SMM handler 112, the example protected region 114, and/or, more generally, the example computing platform 100 of FIG. 1 may include one or more elements, processes and/or devices in addition to, or instead of, those illustrated in FIG. 1, and/or may include more than one of any or all of the illustrated elements, processes and devices.

Figure 5:
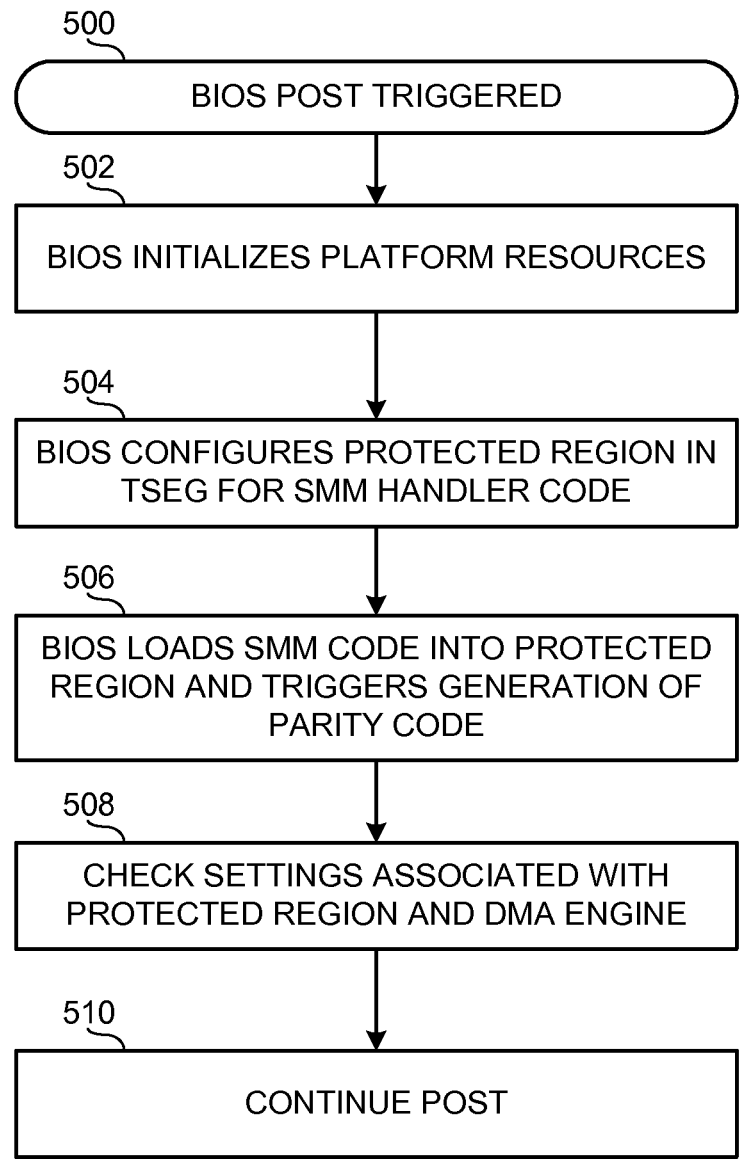
FIG. 5 is a flow diagram representative of an example process that may be implemented using example machine readable instructions that may be executed to implement the example BIOS of FIG. 1 to perform an example power-on self test (POST).
Figure 6:
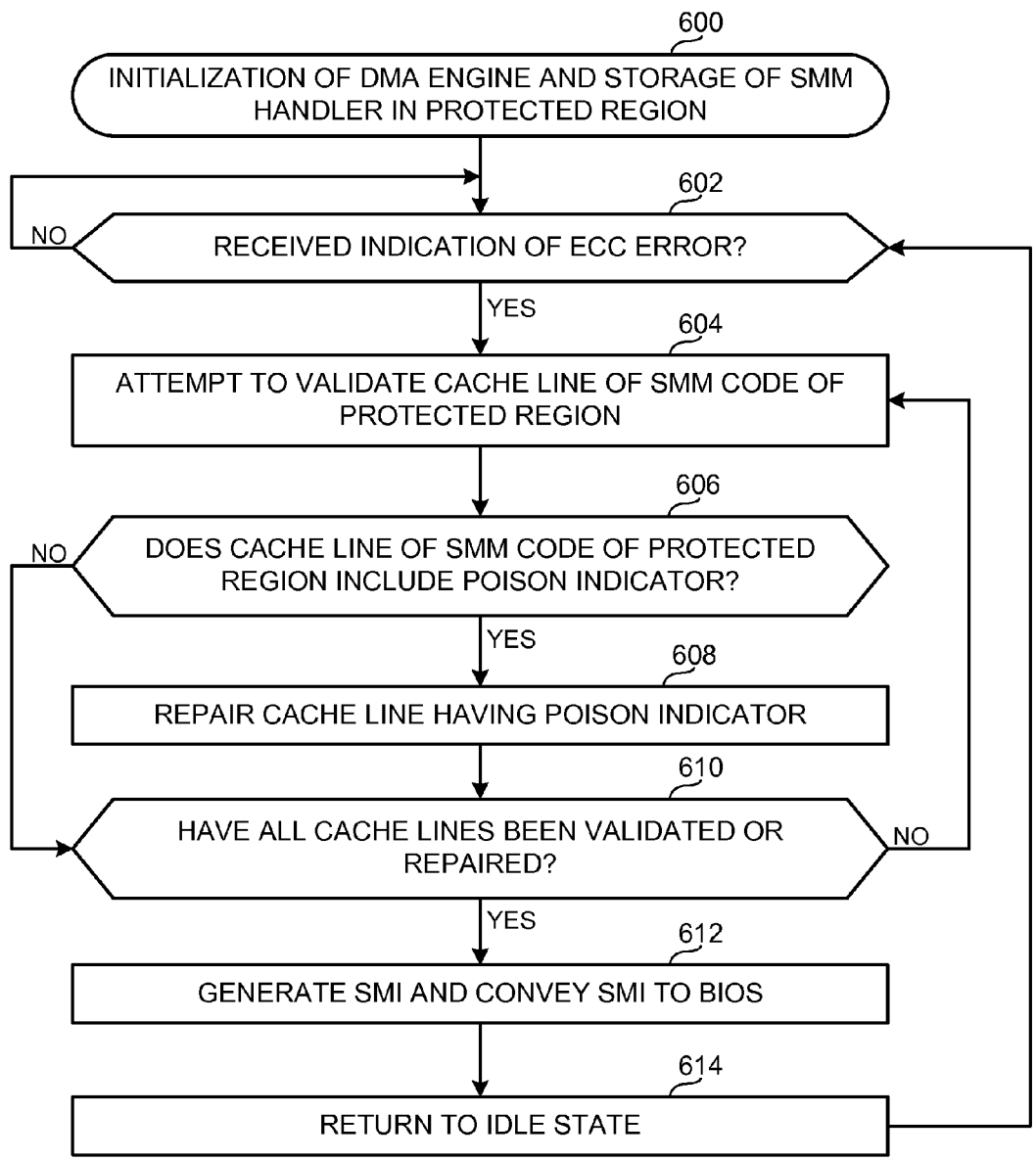
FIG. 6 is a flow diagram representative of an example process that may be implemented using example machine readable instructions that may be executed to implement the example protection mechanism of FIG. 1 to protect a region of the example SMRAM of FIG. 1.

FIG. 5 is a flow diagram representative of an example process that may be implemented using, for example, computer readable instructions that may be executed to implement the example BIOS 106 of FIG. 1 to perform a POST. FIG. 6 is a flow diagram representative of an example process that may be implemented using, for example, computer readable instructions that may be executed to implement the example protection mechanism 108 of FIG. 1 to protect the SMM code of the protected region 114 of SMRAM 110. The example processes of FIGS. 5 and 6 may be performed using a processor, a controller and/or any other suitable processing device. For example, the example processes of FIGS. 5 and 6 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 5 and 6 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 5 and 6 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 5 and 6 may be implemented manually or as any combination(s) of any of the foregoing techniques, for example, any combination of firmware, software, discrete logic and/or hardware. Further, although the example processes of FIGS. 5 and 6 are described with reference to the flow diagrams of FIGS. 5 and 6, other methods of implementing the processes of FIGS. 5 and 6 may be employed. For example, the order of execution of the blocks may be changed, and/or some of the blocks described may be changed, eliminated, sub-divided, or combined. Additionally, any or all of the example processes of FIGS. 5 and 6 may be performed sequentially and/or in parallel by, for example, separate processing threads, processors, devices, discrete logic, circuits, etc.

Referring to FIG. 5, the BIOS 106 is implemented as software and/or firmware in the form of machine readable instructions that are stored in a non-volatile memory coupled to a processor of the computing platform 100 (e.g., the example processor 912 discussed below in connection with FIG. 9). Generally, the BIOS 106 performs one or more hardware and software configuration and test activities (e.g., memory initialization, memory partitioning, etc.) prior to booting the operating system.

In the illustrated example of FIG. 5, when the BIOS 106 begins a POST (block 500), the BIOS 106 initializes the resources of the example computing platform 100 of FIG. 1 (block 502). In addition to the conventional operations performed by the BIOS 106 at block 502, the example BIOS 106 performs initializations in accordance with the examples described herein. In particular, the BIOS 106 configures the protected region 114 to store the example SMM handler 112 in TSEG (block 504). As described above, this configuration includes the BIOS 106 programming the registers 134 of the DMA engine 108 with the location of the protected region 114 in TSEG and locking the registers 134. Further, the BIOS 106 loads the code of the SMM handler 112 into the protected region 114 and, once the SMM handler 112 code has been loaded, triggers the generation of the parity block 130 (block 506). The BIOS 106 confirms the accuracy of the settings and initializations associated with the protected region 114 and the DMA engine 108 (block 508) and then continues and/or otherwise allows the triggered POST (block 510).

Referring to FIG. 6, the protection mechanism 108 is implemented by a DMA engine in the illustrated example. More specifically, the example protection mechanism 108 of the illustrated examples is implemented by a Crystal Beach DMA engine that employs the RAID-5 algorithm and the opcodes thereof. The RAID-5 algorithm utilizes XOR logic for a parity-based method of correcting errors in the code blocks 116-128.

The example flow diagram of FIG. 6 corresponds to behavior of the protection mechanism 108 once the protection mechanism 108 has been initialized (e.g., by the BIOS 106) and the SMM handler 112 code has been loaded in the protected region 114 (block 600). In the illustrated example of FIG. 6, the protection mechanism 108 remains in an idle state until the memory controller 102, via the error detection unit 104 (e.g., an integrated input/output (IIO)), detects an ECC error (block 602). As described above, the protection mechanism 108 is configured to receive or intercept an error indication (e.g., an SMI request) from the memory controller 102. In response to receiving such an indication at block 602, the protection mechanism 108 begins attempting to validate the contents of the protected region 114 of SMRAM 110 (block 604). As described herein, the protection mechanism 108 validates the SMM handler 112 code (e.g., using the validate descriptor 140 of FIG. 1) to ensure that the BIOS 106 does not execute corrupt code when utilizing the SMM mode.

When a cache line of the code block being checked, such as the fifth code block 126, includes a poison indicator (e.g., as placed therein by the memory controller 102 via the error detection unit 104) (block 606), the protection mechanism 108 repairs (e.g., using the repair descriptor 142 of FIG. 1) the cache line having the error (block 608). For example, when the fifth code block 126 includes an error, the following equation is used to repair the fifth code block 126: code_blk5=code_blk0 XOR code_blk1 XOR code_blk2 XOR code_blk3 XOR code_blk4 XOR parity_blk XOR code_blk6.

Once the cache line having the error is repaired, the protection mechanism 108 determines whether the entire SMM code of the protected region 114 has been validated (block 610). Alternatively, referring back to block 606 of FIG. 6, if the cache line attempting to be validated does not include an error, the protection mechanism 108 determines whether the entire SMM code of the protected region 114 has been validated (block 610). If the entire SMM code of the protected region 114 has not been validated, the protection mechanism 108 attempts to validate the next cache line of the protected SMM code (block 604). Otherwise, if the entire SMM code of the protected region 114 has been validated, the SMI generator 144 of the protection mechanism 108 generates an SMI in accordance with the SMI request intercepted or received by the protection mechanism 108 from the memory controller 102 (block 612). The protection mechanism 108 then returns to the idle state (block 614) and awaits another error indication from the memory controller 102 (block 602).

FIG. 7 is a diagram of the code blocks 116-128 of FIG. 1 as protected by a first algorithm of the example protection mechanism of FIG. 1. The columns of FIG. 7 represent cache lines of the code blocks 116-128 and the parity block 130 of FIG. 1. For example, a first cache line labeled as 'C1' in FIG. 7 represents of first cache line. FIG. 7 illustrates the protection mechanism 108 implementing the RAID-5 parity algorithms to a Crystal Beach (CB) DMA engine. As shown in FIG. 7, multiple bit errors (represented with X's in FIG. 7) can accumulate within any one cache line of a single code or parity block as long as the associated cache lines do not include uncorrectable ECC errors.

FIG. 8 is a diagram of the code blocks of FIG. 1 as protected by a second algorithm of the example protection mechanism of FIG. 1. In particular, FIG. 8 illustrates the protection mechanism 108 implementing the RAID-6 parity algorithms to a Crystal Beach (CB) DMA engine. The RAID-6 configuration provides additional protection such as, for example allowing two cache lines in each column to be protected. To provide this protection, one of the code blocks (code blk6 in the illustrated example) is replaced with a quotient block. The quotient block and the parity block in FIG. 8 are used in accordance with RAID-6 architecture and are used to repair cache line(s) including errors.

Figure 9:
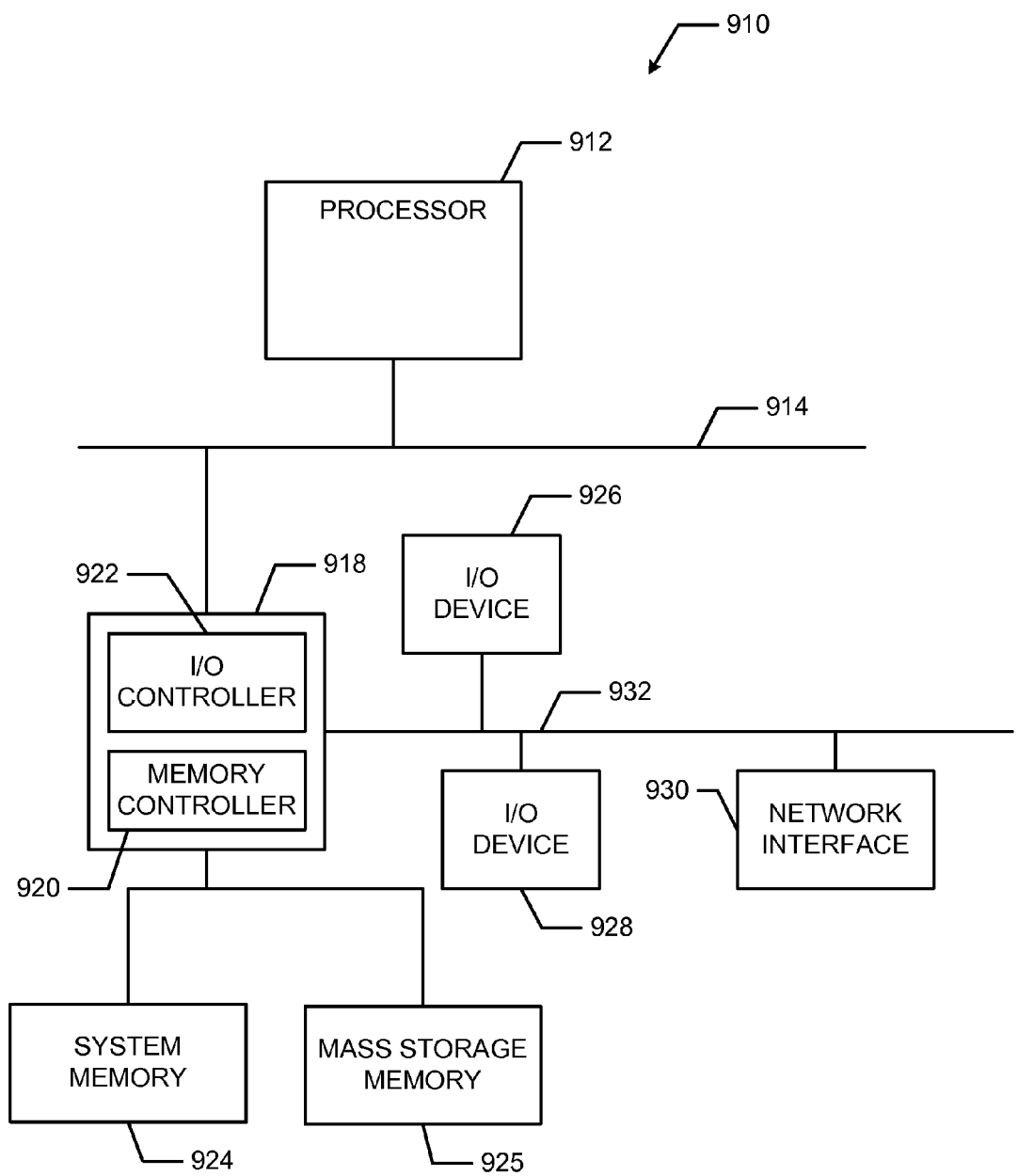
FIG. 9 is a block diagram of an example processor system that may be used to execute the machine readable instructions of FIG. 2 and/or to implement the example computing platform of FIG. 1.

FIG. 9 is a block diagram of an example processor system that may be used to execute the machine readable instructions of FIG. 2 and/or to implement one or more the example components of the example computing platform 100 and/or the example BIOS recovery module 102 of FIG. 1. As shown in FIG. 9, the processor system 910 includes a processor 912 that is coupled to an interconnection bus 914. The processor 912 may be any suitable processor, processing unit or microprocessor. Although not shown in FIG. 9, the system 910 may be a multi-processor system and, thus, may include one or more additional processors that are different, identical or similar to the processor 912 and that are communicatively coupled to the interconnection bus 914.

The processor 912 of FIG. 9 is coupled to a chipset 918, which includes a memory controller 920 and an input/output (I/O) controller 922. The chipset 918 provides I/O and memory management functions as well as a plurality of general purpose and/or special purpose registers, timers, etc. that are accessible or used by one or more processors coupled to the chipset 918. The memory controller 920 performs functions that enable the processor 912 (or processors if there are multiple processors) to access a system memory 924 and a mass storage memory 925.

The system memory 924 may include any desired type of volatile and/or non-volatile memory such as, for example, static random access memory (SRAM), dynamic random access memory (DRAM), flash memory, read-only memory (ROM), etc. The mass storage memory 925 may include any desired type of mass storage device including hard disk drives, optical drives, tape storage devices, etc.

The I/O controller 922 performs functions that enable the processor 912 to communicate with peripheral input/output (I/O) devices 926 and 928 and a network interface 930 via an I/O bus 932. The I/O devices 926 and 928 may be any desired type of I/O device such as, for example, a keyboard, a video display or monitor, a mouse, etc. The network interface 930 may be, for example, an Ethernet device, an asynchronous transfer mode (ATM) device, an 802.11 device, a DSL modem, a cable modem, a cellular modem, etc. that enables the processor system 310 to communicate with another processor system.

While the memory controller 320 and the I/O controller 322 are depicted in FIG. 3 as separate blocks within the chipset 318, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to protect a segment of memory in a computing platform, comprising:
   detecting an interrupt request indicating an error, the error to be handled by a system management mode (SMM) handler;
   preventing the interrupt request from triggering a corresponding interrupt;
   while the interrupt request is prevented from triggering the corresponding interrupt:
      determining whether a protected region of memory dedicated to the SMM handler is corrupt; and
      when the protected region of memory is corrupt, repairing the corrupted region of memory using a parity block of code; and
   in response to confirming the protected region of memory is repaired, ceasing preventing the interrupt request from triggering the interrupt, the interrupt to trigger the SMM handler of the protected region of memory to handle the error associated with the interrupt request.

2. A method as defined in claim 1, wherein a basic input/output system operates in the system management mode to handle the interrupt.

3. A method as defined in claim 1, wherein the protected region of memory is accessible by only a protection mechanism to validate the protected region of memory.

4. A method as defined in claim 1, further comprising generating the parity block to repair code corresponding to the SMM handler stored in the protected region of memory.

5. A method as defined in claim 1, further comprising storing a location of the protected region of memory in one or more registers and locking the registers.

6. A method as defined in claim 1, wherein preventing the interrupt request from triggering the interrupt comprises preventing a basic input/output system from handling the error.

7. A method as defined in claim 6, wherein the basic input/output system loads the SMM handler into the protected region of memory during an initialization process.

8. A tangible computer readable medium having instructions stored thereon that, when executed, cause a machine to at least:
   detect an interrupt request associated with an error to be handled by a system management mode (SMM) handler, the interrupt request comprising a request to generate an interrupt;
   prevent the interrupt request from triggering the requested interrupt;
   before allowing the detected interrupt request to trigger the interrupt:
      determine whether a protected region of memory dedicated to the SMM handler is corrupt; and
      when the protected region of memory is determined to be corrupt, repair the corrupted region of memory using a parity block of code; and
   when the protected region of memory is determined to be corrupt no longer, enabling the interrupt request to trigger the interrupt to cause the SMM handler of the protected region of memory to handle the error associated with the interrupt request.

9. A tangible computer readable medium as defined in claim 8, wherein the interrupt causes a basic input/output system to operate in the system management mode to handle the interrupt.

10. A tangible computer readable medium as defined in claim 8, wherein the protected region of memory determined to be corrupt is accessible by only a protection mechanism to validate the protected region of memory.

11. A tangible computer readable medium as defined in claim 8 further comprising instructions that, when executed, cause the machine to generate the parity block to be used in repairing code corresponding to the SMM handler stored in the protected region of memory.

12. A tangible computer readable medium as defined in claim 8 having instructions stored thereon that, when executed, cause the machine to store a location of the protected region of memory in one or more registers and to lock the registers.

13. A tangible computer readable medium as defined in claim 8, wherein the protected region of memory determined to be corrupt is designated as protected by a basic input/output system.

14. A tangible computer readable medium as defined in claim 13, wherein generation of the interrupt causes the basic input/output system to load the SMM handler into the protected region of memory during an initialization process.

15. An apparatus to protect a segment of memory, comprising:
- a communication interface to receive an interrupt request related to an error to be handled by a system management mode (SMM) handler;
- an interrupt manager to prevent the interrupt request from generating an interrupt to handle the error until a segment of a protected region of memory corresponding to the SMM handler is verified as uncorrupt;
- a repair descriptor to, while the interrupt manager is preventing the generation of the interrupt, repair any corrupted segments of the protected region of memory corresponding to the SMM handler; and
- a validate descriptor to, while the interrupt manager is preventing the generation of the interrupt, confirm that any corrupted segments of the protected region of memory have been repaired,
- the interrupt manager to cease the prevention of the interrupt in response to the validate descriptor confirming that the protected region of memory is repaired.

16. An apparatus as defined in claim 15, wherein the protected region of memory is located in a top of segment portion of system management random access memory.

17. An apparatus as defined in claim 15, wherein the repair descriptor is to utilize a parity block to repair the corrupted segment of the protected region of memory.

18. An apparatus as defined in claim 17, further comprising a generate descriptor to generate the parity block based on code of the SMM handler stored in the protected region of memory.

19. An apparatus as defined in claim 15, wherein the interrupt manager is further to convey the interrupt corresponding to the interrupt request to a basic input/output system.

20. An apparatus as defined in claim 19, wherein the basic input/output system is to initiate the SMM handler to address a cause of the interrupt request.

* * * * *